United States Patent [19]

Takanashi et al.

[11] Patent Number: 5,046,828
[45] Date of Patent: Sep. 10, 1991

[54] APPARATUS FOR READING OUT A CHARGE LATENT IMAGE

[75] Inventors: Itsuo Takanashi, Kamakura; Shintaro Nakagaki, Fujisawa; Hirohiko Shinonaga; Tsutou Asakura, both of Yokohama; Masato Furuya; Hiromichi Tai, both of Yokosuka, all of Japan

[73] Assignee: Victor Company of Japan, Ltd., Japan

[21] Appl. No.: 439,660

[22] Filed: Nov. 22, 1989

[30] Foreign Application Priority Data

Nov. 25, 1988 [JP]  Japan ................................ 63-297538

[51] Int. Cl.⁵ .............................................. G02F 1/13
[52] U.S. Cl. .................................................... 359/72
[58] Field of Search ................... 350/342, 331 R, 334; 358/233, 236; 355/262, 265, 210

[56] References Cited

U.S. PATENT DOCUMENTS

| | | | |
|---|---|---|---|
| 3,951,519 | 4/1976 | Schmidlin et al. | 350/342 |
| 4,386,836 | 6/1983 | Aoki et al. | 350/331 R |
| 4,392,719 | 7/1983 | Sekimoto | 350/342 |
| 4,782,348 | 11/1988 | Siegner | 350/334 |
| 4,804,994 | 2/1989 | Sasaki et al. | 355/251 |
| 4,945,423 | 7/1990 | Takanashi et al. | 358/236 |

Primary Examiner—Stanley D. Miller
Assistant Examiner—Anita Pellman Gross
Attorney, Agent, or Firm—Lowe, Price, Leblanc, Becker & Shur

[57] ABSTRACT

An apparatus for reading out a charge latent image from a recording medium includes a photo-modulation member exposed to an electric field from the recording medium and exposed to reading light. The photo-modulation member varies a condition of the reading light in accordance with the electric field. A photoconductive member is disposed between the recording medium and the photo-modulation member. Control light is applied to the photoconductive member. The control light has an intensity which varies with respect to time.

3 Claims, 5 Drawing Sheets

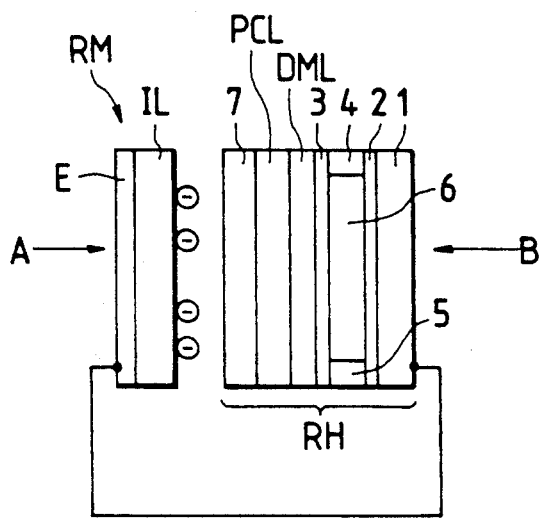
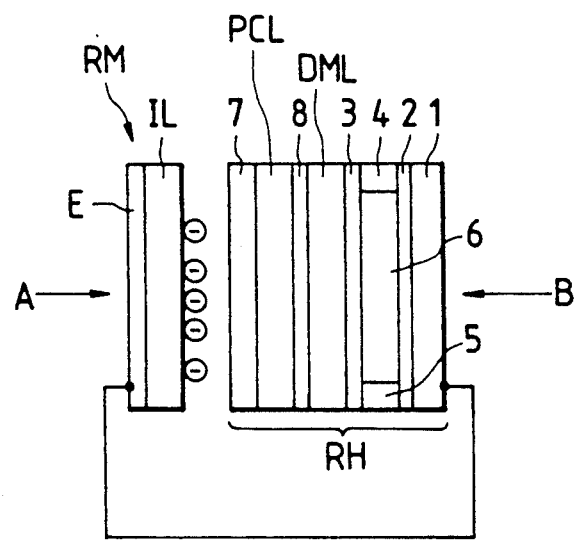
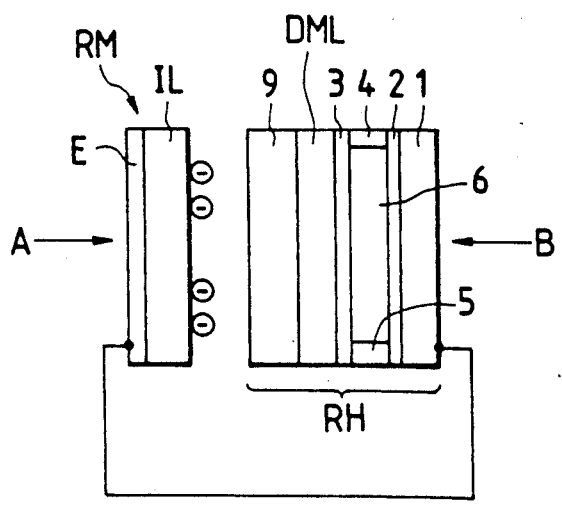

APPARATUS FOR READING OUT A CHARGE LATENT IMAGE

BACKGROUND OF THE INVENTION

This invention relates to an apparatus for reading out a charge latent image.

The applicant previously proposed an imaging system and a recording system in which an imaging apparatus used photo-photo conversion elements to generate an optical image with a high resolution, and the optical image was recorded on a recording medium as a charge latent image by use of photo-charge conversion elements. The applicant also proposed an apparatus for detecting the distribution of a surface potential which was used in reading out the charge latent image from the recording medium and thus generating an electric signal representative of the charge latent image.

SUMMARY OF THE INVENTION

It is an object of this invention to provide an advanced apparatus for reading out a charge latent image.

According to this invention, an apparatus for reading out a charge latent image from a recording medium includes a photo-modulation member exposed to an electric field from the recording medium varies a condition of the reading light in accordance with the electric field. A photoconductive member is disposed between the recording medium and the photo-modulation member. Control light is applied to the photoconductive member. The control light has an intensity which varies in a time axis.

BRIEF DESCRIPTION OF THE DRAWINGS

FIG. 4 is a diagram of a reading apparatus according to a fourth embodiment of this invention.

FIG. 5 is a diagram of a reading apparatus according to a fifth embodiment of this invention.

FIG. 6 is a diagram of a reading apparatus according to a sixth embodiment of this invention.

Like and corresponding elements are denoted by the same reference characters throughout the drawings.

DESCRIPTION OF THE FIRST PREFERRED EMBODIMENT

Figure 13A:
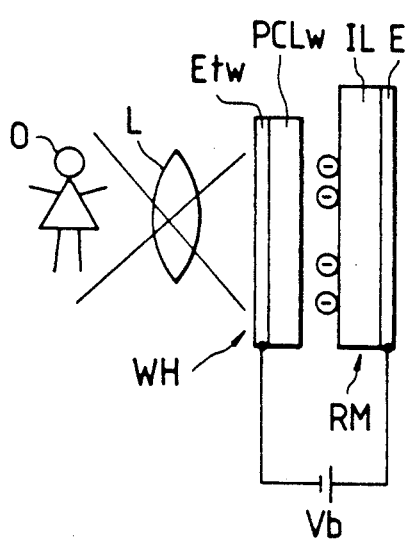
FIGS. 13(a) through 13(e) show various recording systems and recording members used in the embodiments of this invention.

FIG. 13(a) shows a first example of a recording system. With reference to FIG. 13(a), a recording medium RM has a laminated structure including a dielectric layer IL and an electrode layer E. A writing head WH has a laminated structure including a transparent electrode layer ETw and a photoconductive layer PCLw. The photoconductive layer PCLw of the writing head WH opposes the dielectric layer IL of the recording medium RM.

The positive terminal of a dc power source Vb is electrically connected to the electrode layer E of the recording medium RM. The negative terminal of the power source Vb is electrically connected to the electrode layer Etw of the writing head WH. Therefore, an electric field is applied to a region between the electrode layers E and Etw which accommodates the photoconductive layer PCLw of the writing head WH and the dielectric layer IL of the recording medium RM.

An optical image of an object O is focused by a lens L on the photoconductive layer PCLw of the writing head WH. The electric resistance of the photoconductive layer PCLw varies with the optical image of the object O. As a result, the electric field between the opposed surfaces of the photoconductive layer PCLw and the dielectric layer IL varies with the optical image of the object O, and a charge latent image corresponding to the optical image of the object O is formed on the surface of the dielectric layer IL of the recording medium RM due to aerial discharge.

Figure 1:
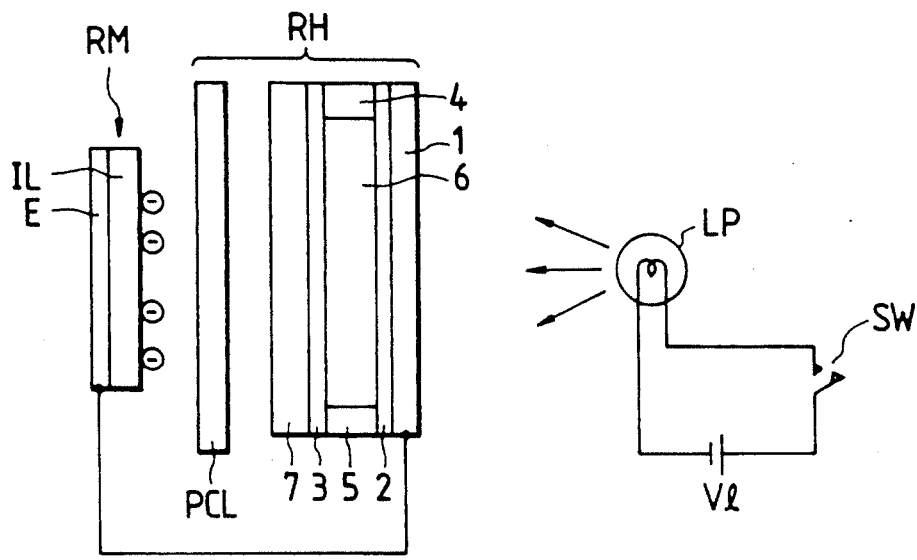
FIG. 1 is a diagram of a reading apparatus according to a first embodiment of this invention.

FIG. 1 shows a reading system according to a first embodiment of this invention. With reference to FIG. 1, a reading head RH is opposed to the recording medium RM to detect a charge latent image on the recording medium RM. The reading head RH includes a transparent electrode layer 1, transparent aligning films 2 and 3, spacers 4 and 5, a liquid crystal layer 6, a transparent base plate 7, and a photoconductive layer PCL. The liquid crystal layer 6 is sandwiched between the aligning films 2 and 3. The spacers 4 and 5 are also provided between the aligning films 2 and 3. The combination of the members 2-6 is supported between the base plate 7 and the transparent electrode layer 1. The photoconductive layer PCL is supported on the base plate 7 in a suitable way. The photoconductive layer PCL opposes the dielectric layer IL of the recording medium RM and extends between the dielectric layer IL of the recording medium RM and the base plate 7 of the reading head RH. The electrode layer 1 of the reading head RH is electrically connected to the electrode layer E of the recording medium. The base plate 7 of the reading head RH has a high dielectric constant to shorten the effective distance between the liquid crystal layer 6 of the reading head RH and the recording medium RM to increase the resolution in reading out the charge latent image from the recording medium RM.

A light source LP is located in the rear of the reading head RH. The light source LP is electrically connected to an electric power source Vl via a switch SW.

When the switch SW is closed, the light source LP is activated by the power source Vl so that the light source LP emits light. This light is referred to as control light. The control light emitted from the light source LP travels to the while surface of the photoconductive layer PCL via the transparent electrode layer 1, the aligning film 2, the liquid crystal layer 6, the aligning film 3, and the base plate 7. The whole region of the photoconductive layer PCL is turned into a low-resistance state by the applied control light. The electric field generated from the charge latent image is cut off by the low-resistance photoconductive layer PCL and is thus prevented from reaching the liquid crystal layer 6.

When the switch SW is opened, the light source LP is deactivated so that the light source LP suspends the emission of control light. Therefore, the application of the control light to the photoconductive layer PCL is interrupted so that the whole region of the photoconductive layer PCL turns into a high-resistance state. The electric field generated from the charge latent image is enabled by the high-resistance photoconductive layer PCL to reach the liquid crystal layer 6. In other words, the liquid crystal layer 6 is exposed to the electric field representative of the charge latent image.

Under conditions where the light source LP remains deactivated and thus the liquid crystal layer 6 is exposed to the electric field representative of the charge latent image, when linearly polarized reading light is passed through the liquid crystal layer 6 by a suitable optical arrangement (not shown), the polarization plane of the reading light outputted from the liquid crystal layer 6 varies with the intensity of the electric field in the liquid crystal layer 6 so that the polarization of the output reading light represents the charge latent image. A suitable optical and photoelectric arrangement (not shown) senses the rotation angle of the polarization plane of the output reading light and converts the sensed rotation angle into a corresponding electric signal representative of the charge latent image. Some example of the previously-mentioned optical arrangement and the above-mentioned optical and photoelectric arrangements are shown in U.S. patent application, Ser. No. 372,507, filed June 28, 1989, the disclosure of which is hereby incorporated by reference.

In an assumed case where a dc current flows through a liquid crystal, the dc current causes ionized impurities to form charge carriers oxidizing or reducing the material of the liquid crystal. As the material of the liquid crystal is oxidized or reduced, the liquid crystal is deteriorated. Therefore, it is generally desirable to apply an alternating electric field to a liquid crystal to prevent such a deterioration of the liquid crystal. This desire is satisfied as follows.

When the switch SW is opened, the electric field representative of the charge latent image is applied to the liquid crystal layer 6 as described previously. When the switch SW is closed, the application of the electric field to the liquid crystal layer 6 is interrupted. The switch SW is periodically opened and closed by a suitable electric circuit in response to a pulse signal so that the liquid crystal layer 6 is exposed to an alternating electric field.

DESCRIPTION OF THE SECOND PREFERRED EMBODIMENT

Figure 2:
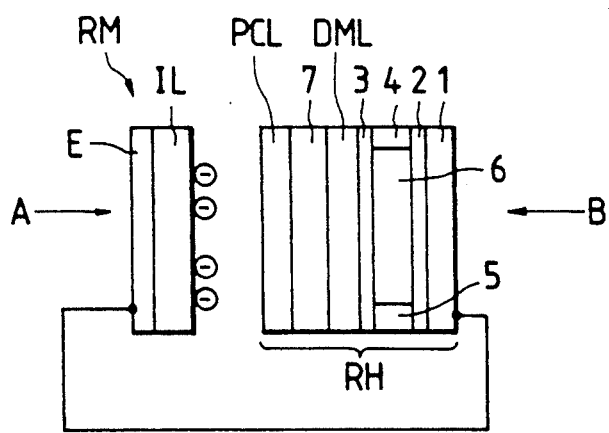
FIG. 2 is a diagram of a reading apparatus according to a second embodiment of this invention.

FIG. 2 shows a second embodiment of this invention which is similar to the embodiment of FIG. 1 except for designs indicated later. In the embodiment of FIG. 2, the photoconductive layer PCL is directly formed on the base plate 7, and a dielectric mirror layer DML is added between the base plant 7 and the aligning film 3.

The reading light travels along the direction B and enters the reading head RH. The reading light reaches the dielectric mirror layer DML via the electrode layer 1, the aligning film 2, the liquid crystal layer 6, and the aligning film 3, and is then reflected by the dielectric mirror layer DML. The reflected reading light travels through the aligning film 3, the liquid crystal layer 6, the aligning film 2, and the electrode layer 1 and exits from the reading head RH.

The electrode layer E and the dielectric layer IL of the recording medium RM are transparent. The control light for changing the resistance of the photoconductive layer PCL of the reading head RH is applied to the photoconductive layer PCL via the recording medium RM in the direction A.

DESCRIPTION OF THE THIRD PREFERRED EMBODIMENT

Figure 3:
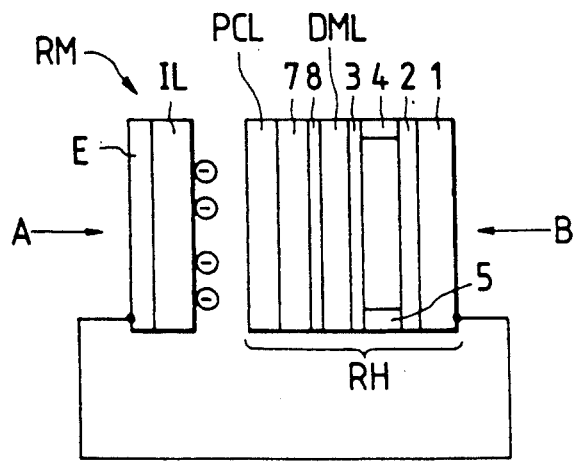
FIG. 3 is a diagram of a reading apparatus according to a third embodiment of this invention.

FIG. 3 shows a third embodiment of this invention which is similar to the embodiment of FIG. 2 except that an opaque film 8 is added between the dielectric mirror layer DML and the base plate 7. The opaque film 8 separates the reading light from the control light for the photoconductive layer PCL so that the control light is prevented from interfering with the reading light.

DESCRIPTION OF THE FOURTH PREFERRED EMBODIMENT

FIG. 4 shows a fourth embodiment of this invention which is similar to the embodiment of FIG. 2 except that the base plate 7 and the photoconductive layer PCL are exchanged in position.

DESCRIPTION OF THE FIFTH PREFERRED EMBODIMENT

FIG. 5 shows a fifth embodiment of this invention which is similar to the embodiment of FIG. 3 except that the base plate 7 and the photoconductive layer PCL are exchanged in position.

DESCRIPTION OF THE SIXTH PREFERRED EMBODIMENT

FIG. 6 shows a sixth embodiment of this invention which is similar to the embodiment of FIG. 3 except for the following arrangement. In the embodiment of FIG. 6, a photoconductive film 9 made of bismuth silicon oxide ($Bi_{12}SiO_{20}$, generally shortened to "BSO") replaces the combination of the base plate 7, the opaque film 8 and the photoconductive layer PCL. Blue light is used as control light for the photoconductive film 9 while red light is used as the reading light.

DESCRIPTION OF THE SEVENTH PREFERRED EMBODIMENT

Figure 7:
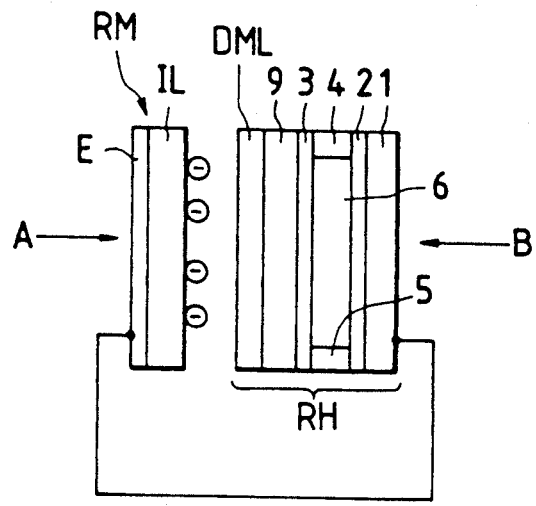
FIG. 7 is a diagram of a reading apparatus according to a seventh embodiment of this invention.

FIG. 7 shows a seventh embodiment of this invention which is similar to the embodiment of FIG. 6 except that the dielectric mirror layer DML and the photoconductive layer 9 are exchanged in position.

The control light for the photoconductive film 9 has a wavelength different from that of the reading light, and the dielectric mirror layer DML reflects the reading light but allows the control light to pass therethrough.

DESCRIPTION OF THE EIGHTH PREFERRED EMBODIMENT

Figure 8:
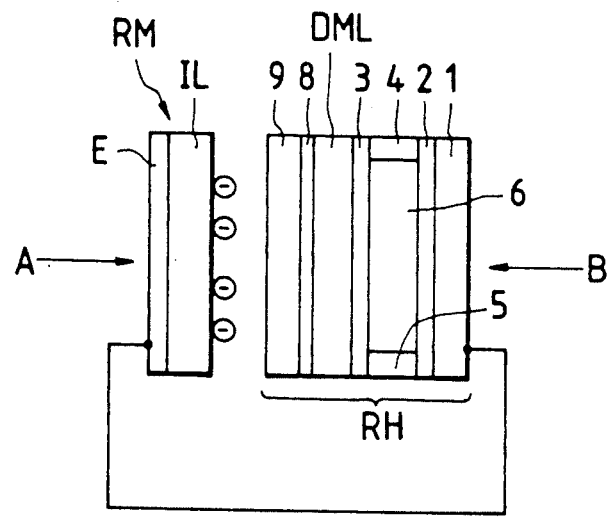
FIG. 8 is a diagram of a reading apparatus according to an eighth embodiment of this invention.

FIG. 8 shows an eighth embodiment of this invention which is similar to the embodiment of FIG. 6 except that an opaque film 8 is added between the photoconductive layer 9 and the dielectric mirror layer DML.

DESCRIPTION OF THE NINTH PREFERRED EMBODIMENT

Figure 9:
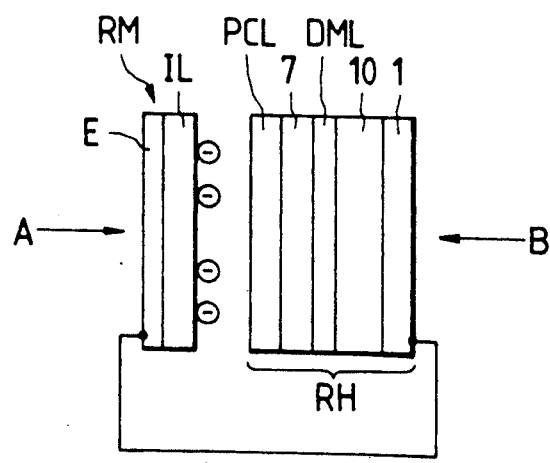
FIG. 9 is a diagram of a reading apparatus according to a ninth embodiment of this invention.

FIG. 9 shows a ninth embodiment of this invention which is similar to the embodiment of FIG. 2 except that a photo-modulation layer 10 made of electrooptic material such as a single crystal of lithium niobate replaces the combination of the aligning films 2 and 3, the spacers 4 and 5, and the liquid crystal layer 6. The operation of the photo-modulation layer 10 is similar to the operation of the liquid crystal layer 6.

DESCRIPTION OF THE TENTH PREFERRED EMBODIMENT

Figure 13B:
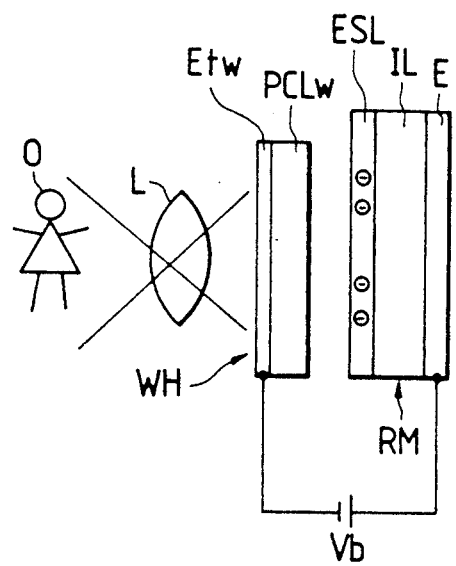

FIG. 13(b) shows a second example of a recording system. With reference to FIG. 13(b), a recording medium RM has a laminated structure including a charge movement obstructing layer ESL, a dielectric layer IL, and an electrode layer E. These layers ESL, IL, and E are united without any gaps therebetween. A writing head WH has a laminated structure including a transparent electrode layer Etw and a photoconductive layer PCLw. These layers Etw and PCLw are united without any gap therebetween. The photoconductive layer PCLw of the writing head WH opposes the charge movement obstructing layer ESL of the recording medium RM.

The charge movement obstructing layer ESL is composed of a thin dielectric film designed such that a tunneling current flows through the film due to the tunnel effect when a great electric field is applied to the film. For example, the charge movement obstructing layer ESL is composed of a thin film of silicon dioxide or aluminum oxide.

The positive terminal of a dc power source Vb is electrically connected to the electrode layer E of the recording medium RM. The negative terminal of the power source Vb is electrically connected to the electrode layer Etw of the writing head WH. Therefore, an electric field is applied to a region between the electrode layers E and Etw which accommodates the photoconductive layer PCLw of the writing head WH, and the charge movement obstructing layer ESL and the dielectric layer IL of the recording medium RM.

An optical image of an object O is focused by a lens L on the photoconductive layer PCLw of the writing head WH. The electric resistance of the photoconductive layer PCLw varies with the optical image of the object O. As a result, the electric field between the opposed surface of the photoconductive layer PCLw and the dielectric layer IL varies with the optical image of the object O, and a primary charge latent image corresponding to the optical image of the object O is formed on the surface of the charge movement obstructing layer ESL of the recording medium RM due to aerial discharge. The charges forming the primary charge latent image are forced through the charge movement obstructing layer ESL due to the tunnel effect caused by the electric field between the electrodes E and Etw, so that a secondary charge latent image corresponding to the primary charge latent image is formed on the interface between the charge movement obstructing layer ESL and the electrode layer E.

Figure 10:
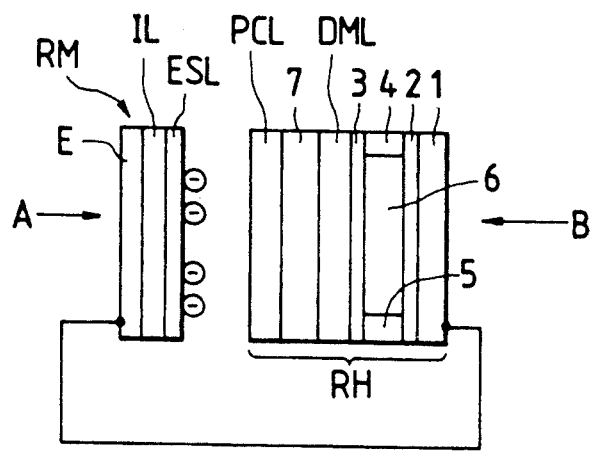
FIG. 10 is a diagram of a reading apparatus according to a tenth embodiment of this invention.

FIG. 10 shows a reading system according to a tenth embodiment of this invention which is similar to the embodiment of FIG. 2 except for the following arrangement. In the embodiment of FIG. 10, the reading head RH opposes the charge movement obstructing layer ESL of the recording medium RM of FIG. 13(b). The electrode layer 1 of the reading head RH is electrically connected to the electrode layer E of the recording medium RM.

DESCRIPTION OF THE ELEVENTH PREFERRED EMBODIMENT

Figure 13C:
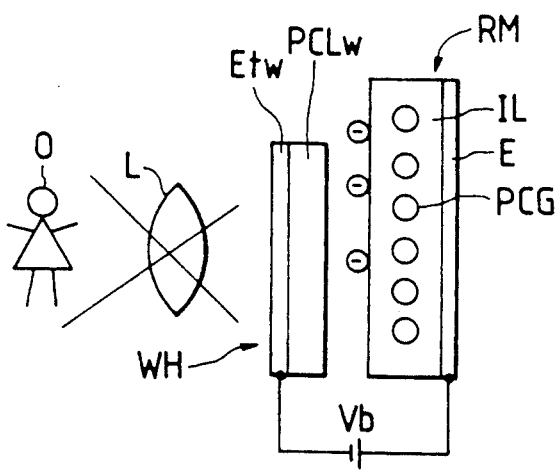

FIGS. 13(c)-13(c) shows a third example of a recording system. With reference to FIG. 13(c), a recording medium RM has a laminated structure including a dielectric layer IL and a transparent electrode layer E. These layers IL and E are united without any gap therebetween. The dielectric layer IL contains an internal layer having particles or corpuscles PCG of photoconductor.

The dielectric layer IL is formed as follows. A first dielectric layer having a high resistivity is prepared. Photoconductor particles PCG are distributed on and fixed to a surface of the first dielectric layer in a suitable process. For example, photoconductor particles PCG are deposited on the surface of the first dielectric layer by a vapor deposition process or a sputtering process using a suitable mask pattern. It is preferable that the photoconductor particles PCG separate from each other. The photoconductor particles PCG and the surface of the first dielectric layer are coated with a second dielectric layer having a high resistivity. The first dielectric layer adjoins the transparent electrode layer E. The second dielectric layer is composed of a thin film designed such that a tunneling current can flow through the film under given conditions. For example, the second dielectric layer is composed of a thin film of silicon dioxide or aluminum oxide. It is preferable that the first and the second dielectric layers are made of the same materials.

A writing head WH has a laminated structure including a transparent electrode layer Etw and a photoconductive layer PCLw. These layers Etw and PCLw are united without any gap therebetween. The photoconductive layer PCLw of the writing head WH opposes the dielectric layer IL of the recording medium RM.

The positive terminal of a dc power source Vb is electrically connected to the electrode layer E of the recording medium RM. The negative terminal of the power source Vb is electrically connected to the electrode layer Etw of the writing head WH. Therefore, an electric field is applied to a region between the electrode layers E and Etw which accommodates the photoconductive layer PCLw of the writing head WH and the dielectric layer IL of the recording medium RM.

An optical image of an object O is focused by a lens L on the photoconductive layer PCLw of the writing head WH. The electric resistance of the photoconductive layer PCLw varies with the optical image of the object O. As a result, the electric field between the opposed surfaces of the photoconductive layer PCLw and the dielectric layer IL varies with the optical image of the object O, and a primary charge latent image corresponding to the optical image of the object O is formed on the surface of the dielectric layer IL of the recording medium RM due to aerial discharge.

Figure 13D:
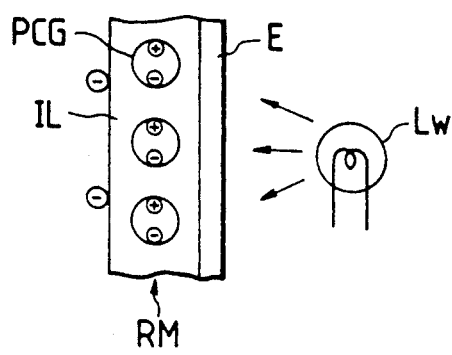
Figure 13E:
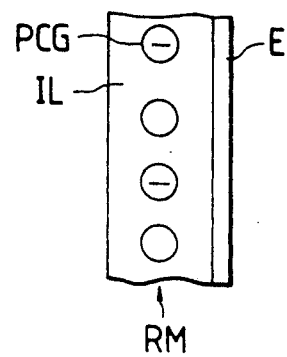

As shown in FIG. 13(d), when light is applied to photoconductor particles PCG in the dielectric layer IL from a light source Lw via the transparent electrode layer E, electron-hole pairs are generated in the photoconductor particles PCG. The electrons forming the primary charge latent image are forced through the second dielectric layer as tunneling current by the electric field between the electron-hole pairs and the electrons forming the primary charge latent image. As shown in FIG. 13(e), the electrons forced into the photoconductor particles PCG cancel the holes of the electron-hole pairs so that only the electrons of the electron-hole pairs remain in the photoconductor particles PCG. The remaining electrons form a secondary charge latent image corresponding to the primary charge latent image. In this way, the photoconductor particles PCG are charged at negative potentials representing a secondary charge latent image.

Figure 11:
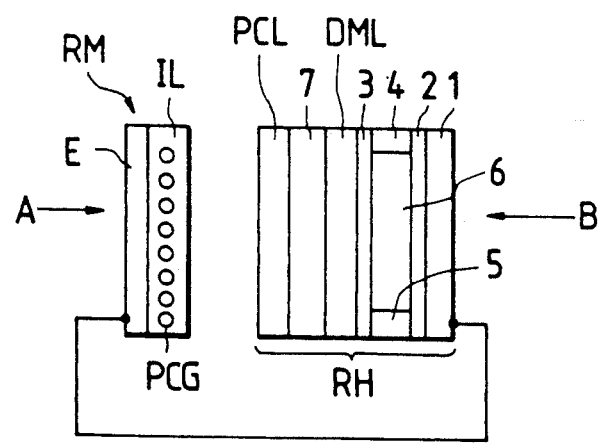
FIG. 11 is a diagram of a reading apparatus according to an eleventh embodiment of this invention.

FIG. 11 shows a reading system according to an eleventh embodiment of this invention which is similar to the embodiment of FIG. 2 except for the following arrangement. In the embodiment of FIG. 11, the reading head RH opposes the dielectric layer IL of the recording medium RM of FIGS. 13(c)-13(e). The electrode layer 1 of the reading head RH is electrically connected to the electrode layer E of the recording medium RM.

DESCRIPTION OF THE TWELFTH PREFERRED EMBODIMENT

Figure 12:
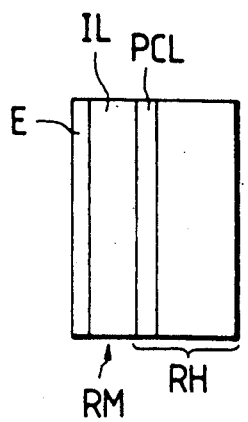
FIG. 12 is a diagram of a reading apparatus according to a twelfth embodiment of this invention.

FIG. 12 shows a twelfth embodiment of this invention which is similar to the embodiment of FIG. 2 except that the photoconductive layer PCL of the reading head RH contacts the dielectric layer IL of the recording medium RM without any gap therebetween.

What is claimed is:

1. An apparatus for reading out a charge latent image from a recording medium, comprising:
   a photo-modulation member exposed to an electric field from the recording medium and exposed to reading light, the photo-modulation member varying a condition of the reading light in accordance with the electric field;
   a photoconductive member disposed between the recording medium and the photo-modulation member; and
   means for applying control light to the photoconductive member, wherein the control light has an intensity which varies with respect to time.

2. An apparatus for reading out a charge latent image from a recording medium, comprising:
   a liquid-crystal member exposed to an electric field from the recording medium exposed to an electric field into optical information; and
   means for selectively allowing and inhibiting said exposure of the liquid-crystal member to the electric field to subject the liquid-crystal member to an alternating electric field.

3. The apparatus of claim 2 wherein said means comprises a photoconductive member disposed between the recording medium and the liquid-crystal member, and means for intermittently applying light to the photoconductive member.

* * * * *